US008795518B2

(12) United States Patent
Alsaffar

(10) Patent No.: US 8,795,518 B2
(45) Date of Patent: Aug. 5, 2014

(54) METHOD AND SYSTEM FOR WASTEWATER TREATMENT AND DISPOSAL

(76) Inventor: Abdulreidha Alsaffar, Mubaraka Alkabeer (KW)

( * ) Notice: Subject to any disclaimer, the term of this patent is extended or adjusted under 35 U.S.C. 154(b) by 335 days.

(21) Appl. No.: 13/116,509

(22) Filed: May 26, 2011

(65) Prior Publication Data

US 2012/0298576 A1 Nov. 29, 2012

(51) Int. Cl.
*C02F 3/32* (2006.01)
*B01D 53/14* (2006.01)

(52) U.S. Cl.
USPC ...... 210/151; 210/170.01; 210/290; 210/602; 210/916; 95/132

(58) Field of Classification Search
USPC ........... 210/602, 615, 616, 617, 95, 150, 151, 210/170.01, 290, 916; 95/121, 131, 132
See application file for complete search history.

(56) References Cited

U.S. PATENT DOCUMENTS

| | | | |
|---|---|---|---|
| 681,884 A * | 9/1901 | Monjeau | 210/602 |
| 3,582,376 A * | 6/1971 | Ames | 106/725 |
| 3,912,169 A * | 10/1975 | Lodge | 239/110 |
| 3,925,206 A | 12/1975 | Dea | |
| 4,415,450 A * | 11/1983 | Wolverton | 210/602 |
| 4,872,985 A | 10/1989 | Dinges | |
| 6,264,838 B1 | 7/2001 | Nivens, Jr. | |
| 6,277,274 B1 * | 8/2001 | Coffman | 210/150 |
| 6,406,627 B1 | 6/2002 | Wallace | |
| 6,811,700 B2 | 11/2004 | Austin et al. | |
| 6,896,804 B2 * | 5/2005 | Haerther et al. | 210/602 |
| 7,347,940 B2 | 3/2008 | Austin | |
| 2002/0058003 A1 * | 5/2002 | Falkman et al. | 422/275 |
| 2006/0037898 A1 * | 2/2006 | Choi | 210/173 |
| 2008/0155985 A1 * | 7/2008 | Labrador | 60/698 |

FOREIGN PATENT DOCUMENTS

JP 2003-19494 A * 1/2003

* cited by examiner

*Primary Examiner* — Fred Prince
(74) *Attorney, Agent, or Firm* — Lowe Hauptman & Ham, LLP

(57) ABSTRACT

A method and system for waste water treatment and disposal includes the use of a sealed chamber having a plurality of sealed light transmitting windows and a relatively large basin connected to the chamber by a large multi-channel conduit. A large fan exhausts gases, humidity and odor from the chamber into a lower portion of the basin. An upper portion of the basin includes a multi-layer grid including layers of hydro stones and/or artificial hydro stones, sand, fertilizer and earth together with a plurality of shallow rooted trees. Any carbon dioxide produced by the waste water is ultimately converted to oxygen.

1 Claim, 5 Drawing Sheets

Passages for flow of gases and odors

METHOD AND SYSTEM FOR WASTEWATER TREATMENT AND DISPOSAL

FIELD OF THE INVENTION

This invention relates to a method and system for wastewater treatment and disposal and more particularly to a method and treatment of wastewater to remove carbon dioxide, convert carbon dioxide to oxygen and remove odor.

BACKGROUND FOR THE INVENTION

Methods and systems for treating wastewater are well known and have been in use for many years. For example, a U.S. Pat. No. 3,925,206 of Dea discloses a system for home wastewater treatment and disposal. As disclosed, a system for the treatment and disposal of home wastewater suitable for use in areas where conventional systems such as septic systems are inappropriate due to poor soil percolation capabilities. A batch process treatment tank in which the waste liquid is subjected to aerobic treatment is combined with an above-around disposal field in which the treated waste liquid from the aerobic treating tank is dispersed through direct evaporation to the air. Further dispersal is facilitated through the use of evapo-transpiration. The aforementioned above-ground disposal field is suitable for installation on either flat or sloping terrain and is of a sufficient size to prevent overflow of waste liquids.

A more recent patent of Dinges, U.S. Pat. No. 4,872,985 disclosed a method for application of wastewater to plants for improved wastewater treatment. The Dinges patent discloses a method and means for application of wastewater to plants for improved wastewater treatment having an overhead distribution system for application of wastewater to plants. Purification of agricultural, commercial, domestic, mining and industrial liquid waste by passage of the waste through a shallow basin, pond, tank or the like is covered with water or other species of Pontederiaceae, e.g. *Pontederia* spp., in particular, and other species cultured in a hydroponic mode in conjunction with or separately from Pontederiaceae, is accomplished by distribution of recycled liquid waste on the leaves and stems of the plants by spraying, sprinkling, splashing or the like. Depending on the quality and quantity of the wastewater, appropriate application rates, either intermittently or continuously, are utilized to effect positive contact of the liquid waste with living biota attached upon plants roots to attain greater treatment effectiveness and efficiency; to maintain aerobiosis in the root zone; and to, under a continuous application mode exploit plants leaves as solid substrate for biofilm attachment so as to fashion a living filter that further improves system effectiveness, efficiency and cost worthiness.

Further, Austin U.S. Pat. No. 7,347,940 discloses a nitrogen removal system and method for wastewater treatment lagoons. As disclosed, a wastewater treatment process integrates a tidal nitration system with a wastewater treatment lagoon. Raw effluent enters a lagoon having a persistent anoxic or anaerobic state and a long residence time to permit suspended solids to settle to the bottom, forming a blanket of sludge. Water above the sludge blanket is comparatively clearer than raw effluent. Discharge from the clear water zone contains organic carbon, organic nitrogen, ammonia, and other nutrients. In the lagoon, complex carbohydrates and fats are broken down into simpler organic compounds by bacterial action, a substantial portion transformed to carbon dioxide by bacterial respiration, reducing BOD. Organic forms of nitrogen are transformed into ammonium ions by bacterial action. Adjacent to the lagoon is a sump that takes water from the clear zone to a tidal cell, and recycles water from the clear zone into the tidal cell, which then discharges back into the lagoon.

Notwithstanding the above, it is presently believed that there is a need and a potential commercial market for an improved method and system for wastewater treatment in accordance with the present invention. There should be a need and a potential commercial market for such methods and systems because they are suitable for treating animal and human waste, converting carbon dioxide into oxygen and removing odor. Such systems are also efficient, eliminate the use of industrial chemicals, are relatively simple in design, rugged and can be constructed and maintained at a reasonable cost and do not require an extensive use of land.

BRIEF SUMMARY OF THE INVENTION

A system for treating human and animal waste to remove carbon dioxide and odor consists of or comprises a sealed chamber including a plurality of light transmitting windows and a sealable door for introducing waste material into the chamber. A basin is provided adjacent the chamber and a large conduit connects the chamber and the basin. Further, a large fan is provided between the chamber and the conduit for exhausting gases, humidity and odors from the chamber and into a lower part of the basin. A first grid and a plurality of columns support the first grid at a height of about 150 cm above the floor of the basin to a position above the level of the conduit. A plurality of columns supports the grid. A first layer of hydro stones and/or artificial hydro stones are supported on the first grid. Hydro stones are relatively small stones of the type used in the bottom of window boxes or the like and available from many nurseries. A second grid is disposed on the layer of hydro stones and/or artificial hydro stones and a layer of a mixture of hydro sand and fertilizer are disposed on the second grid. A third grid is then disposed on top of the layer of hydro sand and fertilizer and a layer of cotton is positioned on top of the third grid. A fourth grid is positioned on top of the layer of cotton; and a layer of earth with a plurality of trees having shallow roots are planted in the layer of earth so that carbon dioxide will be treated by photo synthesis to release oxygen to the atmosphere.

The invention also contemplates a method for treating waste water containing human and/or animal waste to remove carbon dioxide and odor. The method comprises the steps of providing a sealed chamber having a plurality of light transmitting windows and a sealable door for introducing waste material into the chamber. The method also includes the step of providing a basin adjacent the chamber and a large conduit connecting the chamber and basin with a large fan for exhausting gases, moisture and odor from the chamber through the conduit and into a lower part of the basin. A first grid is provided and disposed in said basin above the level of the conduit. In addition, a layer of hydro stones and/or artificial hydro stones are supported on the first grid and a second grid is disposed on top of the layer of hydro stones and/or artificial stones and a layer of a mixture of hydro sand and fertilizer is disposed on top of the second grid. A third grid is provided on top of the layer of mixed hydro sand and fertilizer and a layer of cotton is disposed on top of the third grid. Further, a fourth grid and a layer of earth on top of the fourth grid are provided and a plurality of trees having shallow roots is disposed on top of the fourth grid. Finally, the method provides a sprinkler system and means such as a plurality of relatively narrow passageways or porous earth are provided to allow gas to pass through the layer of earth to interact with the tress and convert any carbon dioxide to oxygen.

The invention will now be described in connection with the following drawings wherein like reference numerals have been used to identify like parts.

DESCRIPTION OF THE PREFERRED EMBODIMENTS OF THE INVENTION

Figure 1:
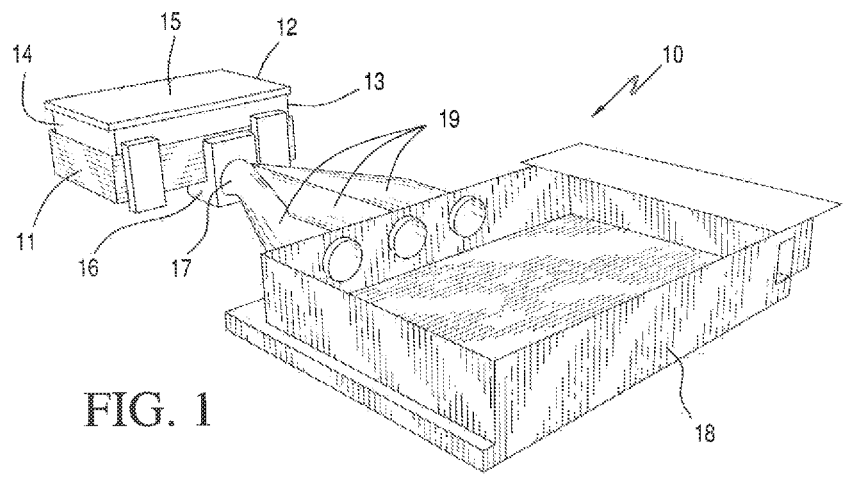
FIG. 1 is a perspective view of a system in accordance with a first embodiment of the invention with a portion of the system removed.

A system and method in accordance with a preferred embodiment of the invention will now be described in connection with FIGS. 1-4. Referring now to FIG. 1 the system 10 includes a sealed building or chamber 12 that includes a sealed door 11 and a plurality of sealed light transmitting windows 11' around an upper portion thereof. The chamber includes an upper and lower portion and in a preferred embodiment includes four steel reinforced concrete walls 14 and a reinforced concrete ceiling or roof 15. The chamber 12 may be disposed below ground or above ground and in a preferred embodiment is partially below ground with a lower portion 11 below ground and upper portion 13 above ground. As shown in FIG. 1 the upper portion 13 includes a plurality of light transmitting windows.

In a preferred embodiment of the invention, the chamber 12 has a length of about 10, 50 or 100 meters, a width of about 50 or 60. The height of the chamber 12 is about 2 meters. However, the area may be divided as for example into 5×5 meter squares for ease of maintenance and installation. A sealable door 11 is disposed in one wall and has a height of about 150 cms and a width of about 1 meter. As shown in FIG. 1, the building or chamber 12 has a large conduit 17 of up to about 160 cms diameter exiting from one side of the chamber 12 and includes a large fan or fan housing 16 of about the same height for exhausting gases, humidity and odor from the chamber 12 and blowing them through the conduit and into a lower portion of a basin 18.

Figure 2:
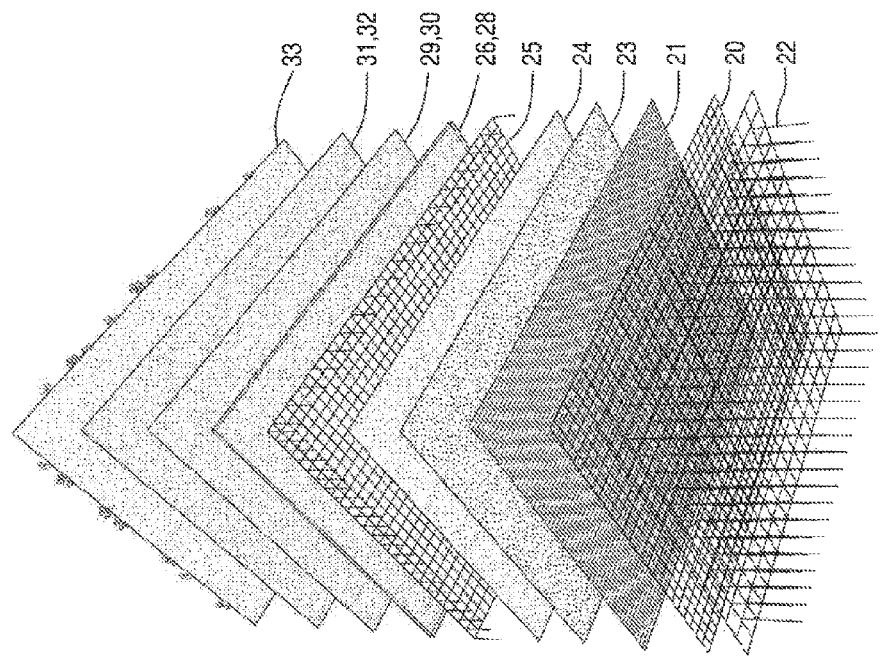
FIG. 2 is a perspective view that illustrates the layers of a basin for treating waste water in accordance with the present invention.
Figure 2:
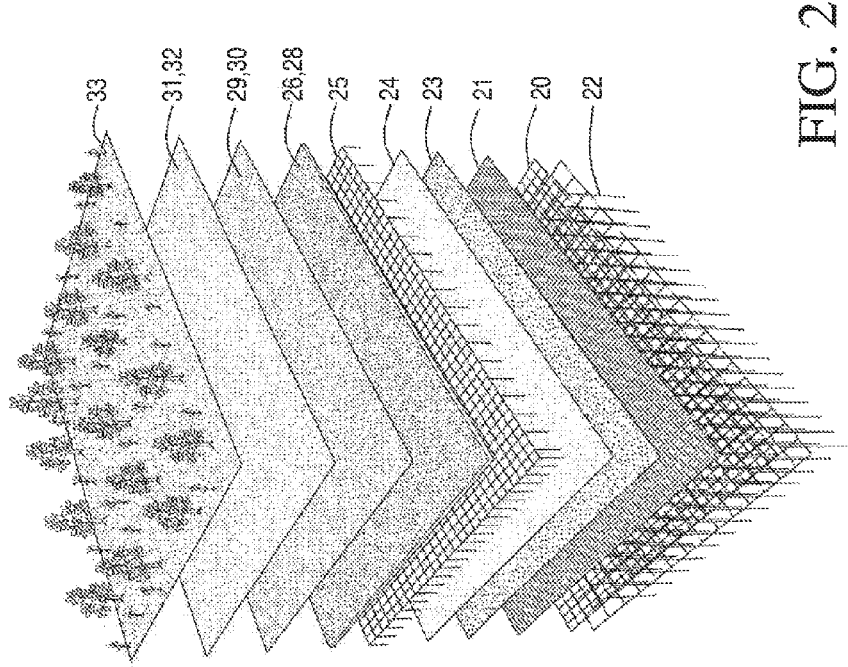
Figure 4:
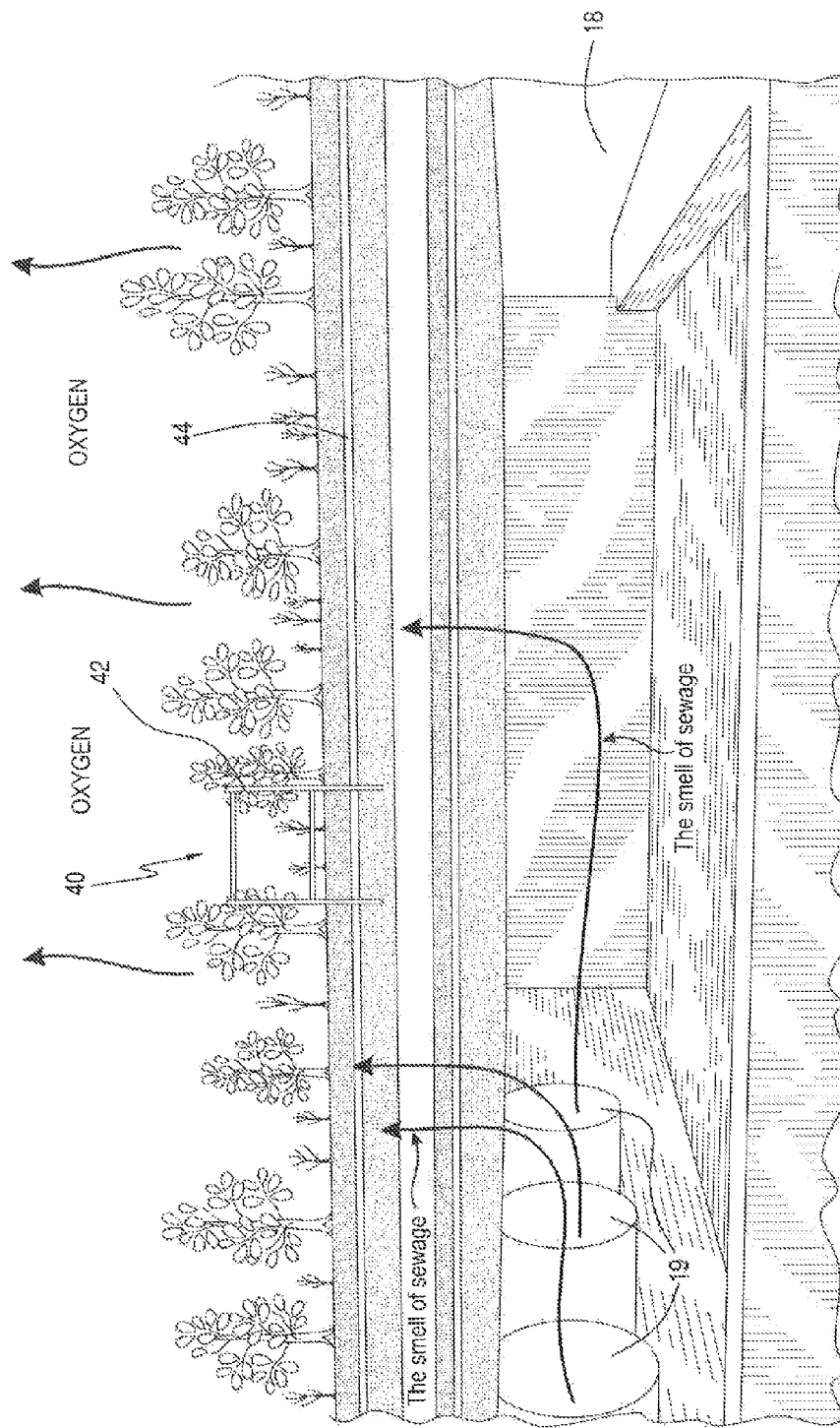
FIG. 4 is a schematic illustration of a system in accordance with the invention to illustrate the absorption of humidity and odor.
Figure 5:
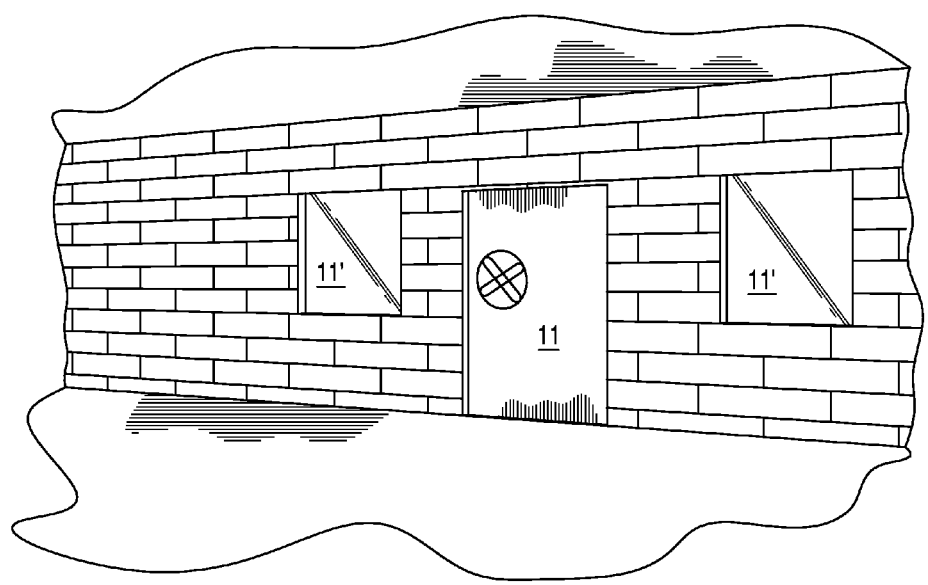
FIG. 5 is a schematic illustration of a wall of a sealed chamber including a sealed door and sealed windows; and, FIG. 6 is a schematic illustration of a pair of fan blades in a large conduit.
Figure 6:
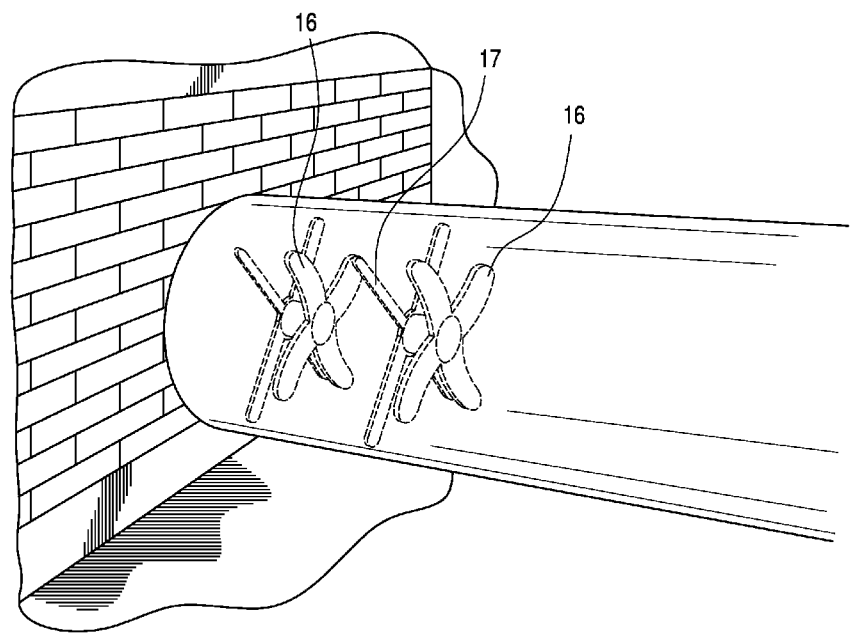

As shown in FIG. 1, the large conduit 17 feeds into three separated conduits 19 for distributing the gases, humidity and odor into different areas of the basin in the lower portion 11 of the basin 18. With reference to FIG. 2, the basin includes a first grid 20 and a plurality of columns 22 having a height of about 150 cms and spaced apart by about 1 meter in a rectangular pattern for supporting the grid 20 above the floor of the basin 18. The aluminum grid 20 includes cross members that are spaced apart by about 10 cms to 20 cms and have a thickness of about 2-4 mms. A layer 21 of agricultural stones and/or hydro stones is supported by the grid 20 and has a thickness of about 10 cms.

Figure 3:
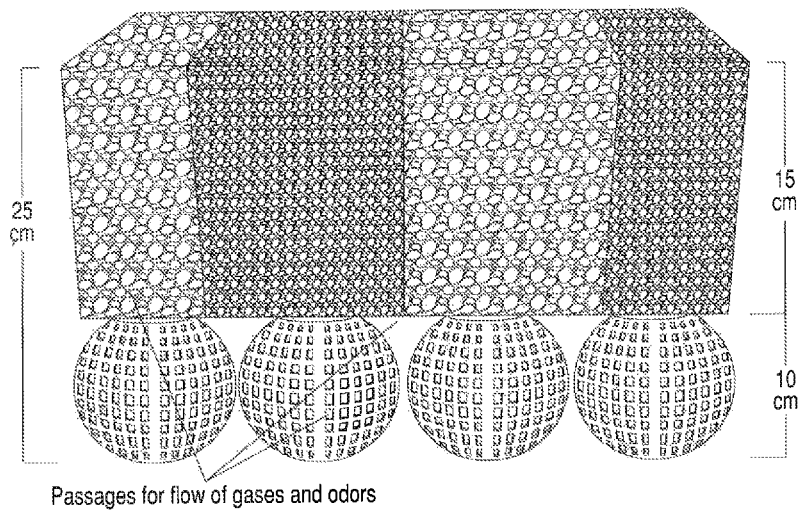
FIG. 3 is a perspective view that illustrates a layer of artificial agricultural stones and an upper layer on top of the stones.

Agricultural stones are similar to what are used in the bottom of planters such as window boxes and are available from many nurseries. Such stones can be manufactured from clay or replaced with small plastic balls with passages passing through the balls to allow gases and odors to pass therethrough. An example of an array of artificial stones is shown in FIG. 3. The artificial stones may be partially replaced by a layer of agricultural sand.

A second aluminum grid 23 having spacings of about 1½× 1½ cms is disposed on the hydro stones and/or artificial hydro stones and supports a layer 24 of hydro sand mixed with fertilizer and/or potting soil having a thickness of about 10 cms. In addition, a third aluminum grid 25 having a spacing of about 1½ cms×1½ cms is disposed on the layer 24 of hydro sand and fertilizer and supports a layer 26 of cotton having an uncompressed thickness of about 15 cms.

In a first embodiment of the invention a fourth aluminum grid 28 is disposed on the first cotton layer 26 and supports a layer of earth having a thickness of about 30 cms. In addition, a plurality of trees having shallow roots are planted in the earth and a plurality of passages or layer of porous earth is provided in order to transmit the carbon dioxide to the trees for conversion to oxygen.

In the preferred embodiment of the invention, the fourth grid 28 supports a second layer of hydro stones having a thickness of about 10 ms. In addition, a fifth grid 30 with a second layer 29 of hydro sand and fertilizer having a thickness of about 10 cms is provided. In this preferred embodiment of the invention a sixth grid with 1½×1½ cm spacing is placed on top of the layer 29 and a second layer 31 of cotton having an uncompressed thickness of about 15 cm is placed on top of the sixth grid.

Finally, a seventh grid 32 is placed on top of the second layer of cotton 31 and a layer of earth 32 having a thickness of 15-30 cms is disposed on top of an eighth grid 33. A plurality of trees and/or plants with shallow roots is then planted in the layer of earth. In the preferred embodiment of the invention the system includes an overhead sprinkler system 40 and a crescent shaped ladder 42 for pruning the trees. Further, a plurality of pathways or channels 44 are provided through the earth and allows gases, humidity and odors to pass through the earth layer.

Suitable trees and/or plants include *Asarum Europaeum, Cyclamen Persicum Mill, Iantago Psyllium, Sambucus Niger, Melissa Officinialis Zedoaria Cureuma, Zedoaria Cureuma, Tussilago Farfara, Ferula Assa Paetida Verbena Officinalis, Orchis Mascula, Colchicum Steveni, Anemone Conorania* var, *Euphorbia Helioscopia, Narcissus Poeticus, Lant camara*, Barmoda amrica, Te koma Fatna, Abe ke, Fall, Dora tana-Bermuda American grass for football playing yards, hed rocon-antifisaf grass-tee coma, lantkamara, fatna, abseky, and tortana.

Further, a method in accordance with the present invention comprises or consists of providing a sealed chamber having a plurality of light transmitting sealed windows and a sealable door for introducing waste material into the chamber. The method also includes the step of providing a basin adjacent the chamber and a large conduit connecting the chamber and basin with a large fan for exhausting gases, moisture and odor from the chamber through the conduit and into a lower part of the basin. In addition, the method includes the step of providing a first grid disposed in the basin above the level of the conduit with a layer of hydro stones and/or artificial hydro stones supported on the first grid. Further, the method includes the step of providing a second grid disposed on top of a layer of hydro stones and/or artificial hydro stones together with the step of providing a mass of hydro sand and fertilizer and mixing the hydro sand and fertilizer and forming a mixture of hydro sand and fertilizer on the second grid. Still further, the method includes the step of providing a third grid on top of a layer of hydro sand and fertilizer and providing a fourth grid. Finally, the method includes the step of providing a layer of cotton on top of the third grid and providing a fourth grid and a layer of earth on top of the fourth grid and planting a plurality of shallow rooted trees in the earth.

While the invention has been described in connection with its preferred embodiments it should be recognized that changes and modifications may be made therein without departing from the scope of the appended claims.

What is claimed is:

1. A system for treating human and animal waste in water to remove carbon dioxide and odor, said system consisting of:
    a sealed chamber having an upper and lower portion and including a plurality of sealed light transmitting windows and a sealable door;
    a basin having a base adjacent said chamber and a large conduit with an opening of up to 160 cm connecting said chamber and said basin;
    a large fan with a diameter of up to 160 cm for exhausting gases, humidity and odor from said chamber through said conduit and into said lower part of said basin;
    a first grid and a plurality of columns supporting said grid about 150 cms above the level of said base of said basin;
    a first layer of spherical artificial hydro stones having a thickness of about 10 cms supported on said first grid;
    a second grid disposed on said layer of artificial hydro stones
    a second layer of a mixture of hydro sand and fertilizer disposed on said second grid and having a thickness of about 10 cms;
    a third grid disposed on top of said layer of hydro sand and fertilizer and having a spacing between the length and width of each square in said grid of about 1½ cms;
    a layer of cotton disposed on said third grid and having an uncompressed thickness of about 15 cms;
    a fourth grid on top of said cotton and a second layer of generally spherical artificial hydro stones having a thickness of about 10 cms disposed on top of said fourth grid;
    a fifth grid on top of said second layer of artificial hydro stones and a second layer of a mixture of hydro sand and fertilizer having a thickness of about 10 cms;
    a sixth grid disposed on top of said second layer of hydro sand and fertilizer and a second layer of cotton having an uncompressed thickness of about 15 cms disposed on said sixth grid;
    a seventh grid disposed on said second layer of cotton and a layer of earth having a thickness of about 10 cms on said second layer of cotton and a layer of earth with a plurality of shallow rooted trees and plants planted in said layer of earth;
    a plurality of sprinklers disposed over said trees for watering said trees and a crescent shaped ladder disposed adjacent and over said trees for pruning said trees; and
    a plurality of channels passing through said layer of earth for allowing gas and humidity to pass through said layer so that carbon dioxide is converted by said trees to oxygen.

* * * * *